US007988199B2

(12) United States Patent
Welsh

(10) Patent No.: US 7,988,199 B2
(45) Date of Patent: Aug. 2, 2011

(54) SAFETY SKIN APPLIQUE KIT FOR IDENTIFICATION OF LOST PERSONS

(76) Inventor: Michele Welsh, Phoenix, MD (US)

( * ) Notice: Subject to any disclaimer, the term of this patent is extended or adjusted under 35 U.S.C. 154(b) by 0 days.

(21) Appl. No.: 12/284,248

(22) Filed: Sep. 19, 2008

(65) Prior Publication Data

US 2009/0091120 A1 Apr. 9, 2009

Related U.S. Application Data

(60) Provisional application No. 60/974,563, filed on Sep. 24, 2007.

(51) Int. Cl.

| | |
|---|---|
| ***B42D 19/00*** | (2006.01) |
| ***B42D 15/00*** | (2006.01) |
| ***B42D 15/10*** | (2006.01) |
| ***G09C 3/00*** | (2006.01) |

(52) U.S. Cl. .................. 283/75; 281/5; 283/61; 283/62; 283/67; 283/70; 283/72; 283/74; 283/81; 283/107; 283/111

(58) Field of Classification Search ............. 63/12, 14.9; 283/67, 71, 72, 117, 56, 61, 62, 70, 74, 75, 283/81, 95, 107, 111; 399/328, 330; 424/401; 428/40.1, 195.1; 522/92, 96, 97, 99, 103, 522/107, 170, 173, 174, 180, 181, 182; 528/9, 528/28, 56, 85; 281/2, 5, 51; *A44C 7/00; A61K 8/18; B32B 3/00, 33/00; C08F 2/46, C08F 2/48; C08L 75/04, 75/16; C03G 15/20*
See application file for complete search history.

(56) References Cited

U.S. PATENT DOCUMENTS

| | | | | |
|---|---|---|---|---|
| 4,522,864 | A | 6/1985 | Humason et al. | |
| 5,024,332 | A * | 6/1991 | Stachler | 283/81 |
| 5,154,956 | A * | 10/1992 | Fradrich | 283/81 |
| 5,186,499 | A * | 2/1993 | Mason | 283/81 |
| 5,431,452 | A * | 7/1995 | Chang et al. | 283/95 |
| 5,859,087 | A * | 1/1999 | Zahora | 522/96 |
| 6,231,952 | B1 | 5/2001 | Lipper | |
| 6,264,786 | B1 | 7/2001 | Cromett | |
| 6,746,051 | B1 * | 6/2004 | Archie et al. | 283/61 |

(Continued)

OTHER PUBLICATIONS

Tattoos With a Purpose (http://www.tattooswithapurpose.com).

(Continued)

*Primary Examiner* — Shelley Self
*Assistant Examiner* — Justin V Lewis
(74) *Attorney, Agent, or Firm* — Ober, Kaler, Grimes & Shriver; Royal W. Craig

(57) ABSTRACT

A safety skin appliqué kit for parents and custodians of children, disabled persons, and the elderly, including a marking pen and a pre-packaged collection of preprinted skin appliqués each removably sandwiched between two carrier sheets. Each of the appliqués further comprise a die cut section of breathable polyurethane tape, printed with a forward image on one side defined by a lightly-colored high-contrast window, and pre-printed plea to call if lost. The appliqués are coated with hypoallergenic acrylate adhesive for application to skin or other surfaces. Parents and custodians can apply one of said appliques' to their child, disabled person, or elderly charge, and write a contact telephone number in the window of the appliqué. This way, if their charge becomes lost, passersby will notice the appliqué, read the contact telephone number, and call the custodian.

15 Claims, 6 Drawing Sheets

U.S. PATENT DOCUMENTS

| | | | | |
|---|---|---|---|---|
| 6,793,999 | B2 * | 9/2004 | Wittmeyer, Jr. | 283/81 |
| 7,133,637 | B2 * | 11/2006 | Lee | 399/330 |
| 7,285,364 | B2 | 10/2007 | Anderson et al. | |
| 2002/0164285 | A1 | 11/2002 | Berryman et al. | |
| 2005/0016211 | A1 * | 1/2005 | Scozzafava | 63/14.9 |
| 2005/0255300 | A1 * | 11/2005 | Funke et al. | 428/195.1 |
| 2005/0258635 | A1 | 11/2005 | Dominguez | |
| 2006/0068146 | A1 * | 3/2006 | Marks et al. | 428/40.1 |
| 2006/0127428 | A1 | 6/2006 | Miskanic | |

OTHER PUBLICATIONS

The Tottoo product at (http://www.tottoos.org).

* cited by examiner

SAFETY SKIN APPLIQUE KIT FOR IDENTIFICATION OF LOST PERSONS

CROSS-REFERENCE TO RELATED APPLICATION(S)

The present application derives priority from U.S. provisional application Ser. No. 60/974,563 filed 24 Sep. 2007.

BACKGROUND OF THE INVENTION

1. Field of Invention

The present invention relates to skin decals and, more particularly, to a safety skin appliqué kit for parents and custodians of children, disabled persons, and the elderly, that provides a noticeable plea for help if lost, and custodian contact information, so that if the dependent does become lost passersby will notice the appliqué, read the contact information, and call the guardian.

2. Description of the Prior Art

The risk of having children or disabled adults lost during a visit to a public or private place is a concern for the host, parents, guardians and other responsible persons. The risk is increased in places where large numbers of persons are moving about freely, such as airports, shopping malls, stadiums and amusement parks. Facilities having activities oriented toward children, such as sports and entertainment complexes pose a particular concern because they operate in large areas with multiple exits. Once separated from their custodian, children can be manipulated or persuaded to make poor decisions which compromise their safety. Experts have reported that children have a much greater chance of avoiding harm if they are found within a short period of time. In order to maximize their safety, it is desirable to quickly locate lost children.

The owners and operators of such facilities spend time and effort to provide security in the form of controlled entrances and exits, video monitoring, security employees and other measures. However, it is extremely rare for either the host or custodian to attach simple identification tags or badges to the person of the child. Even if they did such badges or tags serve only to identify the wearer and do nothing to reunite them with their custodian. Moreover, tags and badges are impermanent and can easily be taken off by children.

One solution is to draw an emergency phone number directly on the child's skin with non-toxic temporary or permanent ink. However, this is very difficult for most people to do with any accuracy, and the result often lacks the color contrast necessary for others to see the number, especially on dark skin. The use of a bright background and dark numbers improves visual impact and rapid identification, and a consistent size or shape or silhouette of the appliqué helps to increase the public's association with its purpose. For these reasons it is more practical to place the number on a separate sheet of material, prior to applying the material to the body.

Temporary tattoos are well-known for aesthetic purposes, and generally include an ink transfer. Examples of such temporally tattoos are found in U.S. Pat. Nos. 3,898,357, 5,421,765, 5,578,353, and 5,601,859, the disclosures of which are incorporated herein by reference. Specifically, U.S. Pat. No. 4,522,864 to Humason et al. provides general background on the structure of temporary tattoos, as well as fabrication materials and methods.

Temporary tattoos have also been used for identification.

For example, United States Patent Application 20050258635 by Dominguez shows a method and apparatus for notification of guardians of location of lost persons by applying a temporary tattoo to the skin of a child or other person who might get lost including the telephone number for directly contacting the guardian. The indicia may also include the name of the person on which it is imparted and directions on contacting a third party if the phone number displayed receives no response.

United States Patent Application 20070107625 by Anderson et al. discloses a particular micro-particle temporary tattoo ink and suggests use for identification markings for humans, for example, emergency information regarding an individual's medical history, "dog-tags" on military personnel, and identification markings on newborn babies to ensure no hospital mix-ups; and identification markings for animals (such as wild animals, livestock, sportlshow animals, and pets), for example, information markings for the return of lost pets.

U.S. Pat. No. 6,264,786 to Cromett (Mattel) issued Jul. 24, 2001 shows a user-created temporary tattoo structure and method of creating a custom temporary tattoo using a PC and printer, in which the user prints an image on a coated sheet, then covers the image with a film, attaches the film/image/coating laminate to skin, and removes a backing sheet to release the image on the skin. This allows a user to create an image on a computer, print the image using a computer printer, and then safely apply the image to human skin.

U.S. Pat. No. 6,231,952 to Lipper shows an identification card with integral removable tattoo including a coated card stock sheet similar to a greeting card and having at least one surface bearing a printed section to be filled in with information about the particular child bearing the card. The tattoo identification card also comprises a removable tattoo displaying information to connect it to the card.

United States Patent Application 20020164285 by Berryman et al. shows a kit containing tattoos for identifying and conveying patient information about medical and surgical patients.

Despite the merits of the concept, conventional temporary tattoos have drawbacks. They are semi-translucent and print information appearing thereon can be difficult to read, especially on dark skin. A more opaque skin applique with high contrast information would be more desirable. Moreover, temporary tattoos are not durable enough. In a protected environment they can last a few days. In a theme park they can last a few hours. In a water park or at the beach, they last a few minutes. Of course, the amount of washing and rubbing to which the tattoo is exposed, and the durability of the tattoo are factors here. In addition, temporary tattoos must be wetted with a warm wet sponge, washcloth or paper towel, and then dried thoroughly. This can take several minutes and is not easy to do with small excited children seeking to enter an amusement park, and the parent must have access to a restroom inasmuch as the water and sponge cannot be included in the packaging. Finally, because of the potentially extended time of contact between the tattoo and a wearer of the tattoo, there is a realistic concern that the inks used could be absorbed through the skin, resulting in possible injury to the wearer of the tattoo, even though the quantity of ink required to produce a tattoo may be quite small. Accordingly, the construction of temporary tattoos according to the prior techniques has been limited to the use of carefully selected, non-toxic inks. There is a need for a skin appliqué made with completely non-toxic ink as found in some digital printers.

What is needed is a turn-key kit that allows parents and guardians to place a standout marking on their charges containing a combination of pre-printed and custom printed indicia, the placement requiring minimum time and effort, and no accessories that must be provided separately, and which will last even in challenging environments such as water parks.

SUMMARY OF THE INVENTION

It is therefore, a primary object of the present invention to provide a skin appliqué for children, disabled persons, and the elderly, that provides a brightly contrasting background to custom contact information of a host, parent, guardian or other responsible person so that if the dependent becomes lost it is more likely that other people will notice the appliqué, read the contact information, and call the guardian.

It is another object to provide a more durable temporary tattoo that can last weeks even in an aquatic environment, and yet which can be intentionally removed quite easily.

It is another object to provide a temporary tattoo with the foregoing qualities, and yet which can be printed digitally with non-toxic ink and not leach any ink through to the skin.

These and other objects are accomplished with a safety skin appliqué kit for parents and custodians of children, disabled persons, and the elderly, that provides a noticeable plea for help if lost, and custodian contact information, so that if the dependent does become lost passersby will notice the appliqué, read the contact information, and call the guardian. The skin appliqué kit generally includes a transparent plastic sleeve for hanging display at the point-of-sale, a folding card stock promotional spline for insertion in the sleeve, an instruction sheet, a plurality of preprinted skin appliqués, and a specialized marking pen. Each of the plurality of preprinted skin appliqués comprises a die cut section of breathable polyurethane tape, printed with a forward image on one side, overlayed with another like section of polyurethane tape (over the image), and coated on the other side with hypoallergenic acrylate adhesive for excellent "quick stick" application to skin or other surfaces. The appliqués are removably sandwiched between two carrier sheets that are removed and discarded during application. To use the appliqués, a custodian (such as a parent) will peel a single appliqué removing the underlying carrier, apply the tape to the forearm of their charge (child), and remove the top protective carrier layer. Then, with enclosed marker, they clearly write an emergency contact telephone number in a designated window of the applied skin appliqué. If the dependent becomes lost, other people will notice the appliqué, read the contact information, and call the custodian.

DETAILED DESCRIPTION OF THE PREFERRED EMBODIMENT

The present invention is a safety skin appliqué kit that parents and custodians can apply to their children or disabled or elderly dependents to provide an indelible safety message on a brightly contrasting background. The message is a combination return plea with contact information, so that if the dependent becomes lost it is much more likely that passersby will notice the appliqué, read the contact information, and call the guardian. Each skin appliqué is pre-printed with a written plea for return: "if lost, please call . . . ", and a high contrast write-in window proximate to the plea. Parents/custodians buy the appliqué kit at the venue gate, apply the appliqués to each of their children, and immediately write their personal cell phone number into the window using the marker provided. The pre-printed plea in combination with the cell phone number prompts other visitors to the park to call and assist in the return of the child if lost. The skin appliqué kit solves an overriding problem with temporary tattoo-type return labels in that it provides an opaque brightly contrasting background to the plea, so that if the dependent becomes lost it is more likely that other people will notice the appliqué, read the contact information, and call the guardian. Moreover, the applique's are easier to apply, and much more robust and durable. They can last weeks in the harshest environments (even water parks), and yet can be removed at will quite easily.

Figure 1:
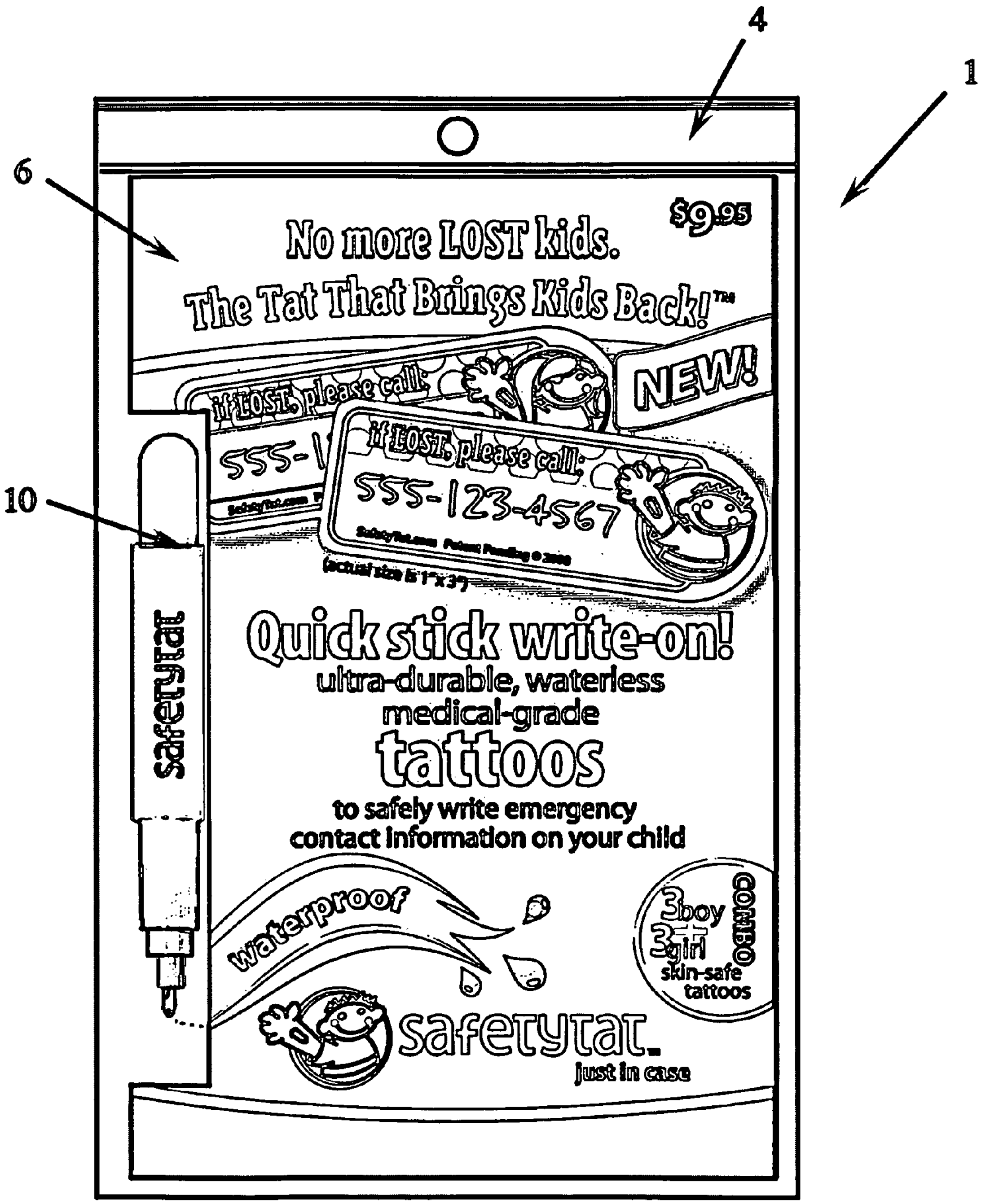
FIG. 1 is a perspective view of the skin appliqué kit 1 according to a preferred embodiment of the present invention.

FIG. 1 is a perspective view of the skin appliqué kit 1 according to a preferred embodiment of the present invention. The skin appliqué kit 1 generally includes a transparent plastic sleeve 4 for hanging display at the point-of-sale, a folding card stock spline 6 for insertion in the sleeve, an instruction sheet (not seen in FIG. 1), a plurality of preprinted skin appliqués 8, and a specialized marking pen 10.

Figure 2:
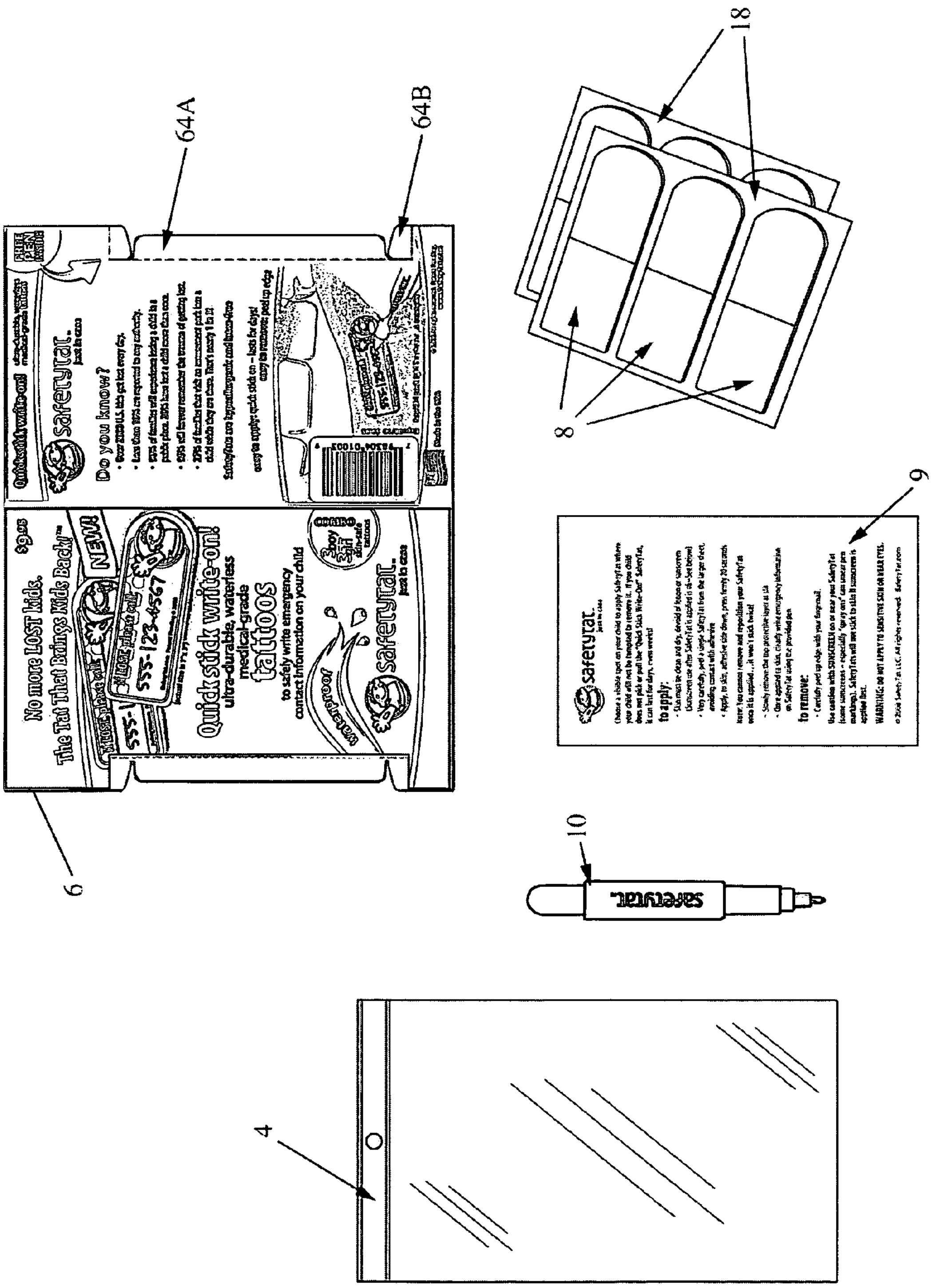
FIG. 2 is an exploded perspective view of the skin appliqué kit 1 as in FIG. 1 illustrating the discrete components.

FIG. 2 is an exploded perspective view of the skin appliqué kit 1 as in FIG. 1 illustrating the discrete components.

The transparent plastic sleeve 4 is preferably a transparent plastic bag or pouch made of thin, flexible, plastic film. Such bags may be constructed of two panels heat sealed together with a topmost press-to-close zipper, constructed in a known manner on a horizontal or vertical form fill sealing machine. The plastic sleeve 4 is defined by a top central hole for hanging display at the point-of-sale.

The marking pen 10 is preferably a surgical skin marking pen as typically used during surgery so as to guide a surgeon in making a proper incision. These are felt tip pens with special inks that resist bleeding as a result of a patient's perspiration, natural oils and fluids. A half-length pen is preferred to allow packaging as shown in FIG. 1, and a Richard-Allan™ Antibacterial Surgical Marking Pen (Non-Sterile) is well-suited.

The card stock spline 6 is a bi-fold cardstock sheet folded lengthwise in two equal panels, and provided with opposing die-cut cutouts along both flanking sides which define a pocket 62 for seating the marking pen 10 when inserted inside the plastic sleeve 4. The illustrated cutouts result in foldover tabs 64A & 64B that are folded inward to establish the pocket 62 within which marking pen 10 can be inserted. Both panels of the card stock spline 6 are printed with promotional information inclusive of facts that provide a purchase incentive, such as "Did you know that over 2000 kids get lost every day? 90% of families will have the heart-stopping experience of losing a child in a public place and 27% (1 in 3!) of families that visit an amusement park, will lose a child while they are there."

Each of the plurality of preprinted skin appliqués 8 is of specialized construction to increase contrast and visibility to passersby. Specifically, each kit includes a plurality of panels 18 of wax-coated carrier paper each bearing a plurality of the skin appliqués 8. Presently, three panels 18 each bearing three skin appliqués 8 are provided. Each skin appliqué 8 further comprises a die cut section of double-layer breathable polyurethane tape, printed with a forward-image between the layers, and under coated with an acrylate skin-adhesive. Each skin appliqué 8 is removably adhered image-up on the carrier panel 18, which may be a wax-coated card stock removable carrier sheet. In addition, a peelable protective layer is adhered overtop the skin appliqué 8, which is removed and discarded during application. A presently preferred selection for the skin appliqué 8 is a double layer 3M™ Breathable Polyurethane Tape, as will be described. This particular tape is well-suited for skin application since it is breathable yet provides a liquid barrier and the hypoallergenic acrylate adhesive provides for excellent "quick stick" to skin or other surfaces. Such tape is typically provided in roll form on a white carrier strip, and may be printed, kiss-cut and provided as the plurality of discrete skin appliqués 8 on the carrier panel 18 at measured intervals as described below.

The instruction sheet 9 is a simple printed paper insert folded within the card stock spline 6, and printed to reflect the method of application and use of the skin appliqués 8. Specifically, the following instructions appear:

1. Be sure your child's skin is clean and dry before you apply the skin appliqué 8, devoid of sunscreen or lotion.
2. Very carefully peel a single skin appliqué 8 from the panel 18, avoiding contact with the underlying adhesive.
3. Apply to skin, adhesive side down, and press firmly for 30 seconds.
4. Slowly remove the top protective layer.
5. With enclosed marker 6, clearly write emergency contact telephone number in the appropriate window of the applied skin appliqué 8.

Figure 3:
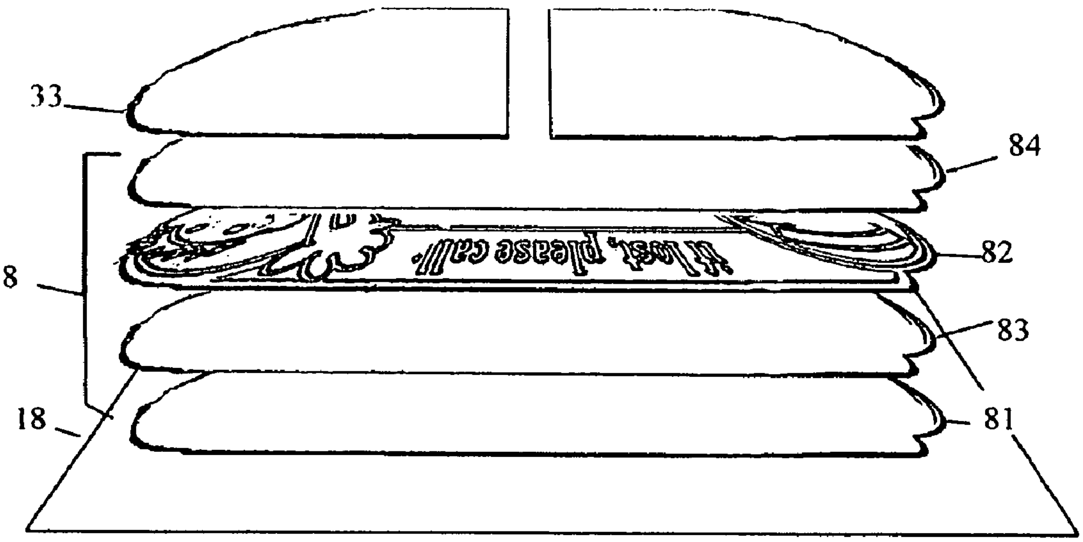
FIG. 3 is an exploded perspective view of an exemplary skin appliqué 8 illustrating the various layers and method of construction.

FIG. 3 is an exploded perspective view of an exemplary skin appliqué 8 illustrating the various layers and method of construction.

Figure 4:
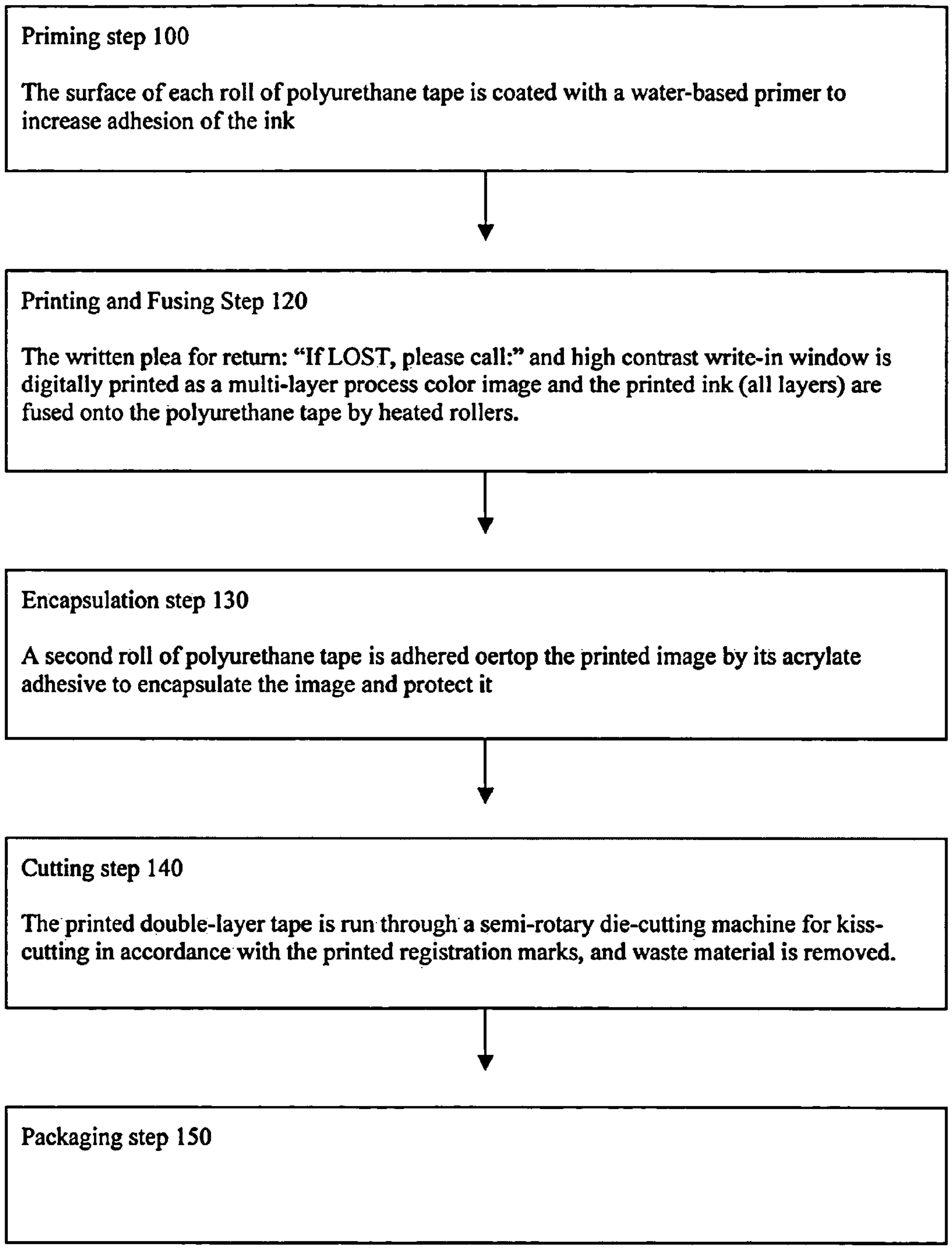
FIG. 4 is a block diagram of the method of construction of a skin appliqué 8.

FIG. 4 is a block diagram illustrating the production steps.

Initially, appropriate polyurethane tape such as 3M™ Breathable Polyurethane Tape is supplied in roll form removably adhered by its acrylate adhesive to a strip of silicone carrier paper. The present production process preferably employs two rolls.

At priming step 100 the surface of one roll of polyurethane tape (but not the other) is prepared with a water-based primer such as Michelman "Digiprime™" to increase adhesion of the ink.

At printing and fusing step 120, all constant printing including the written plea for return: "if lost, please call . . . ", and high contrast write-in window is then performed on this primed roll of tape using an HP Indigo™ digital printing press. The digital press builds a multi-layer process color image, then transfers the layers of ink onto the primed polyurethane tape. The opacity of the write-in window is achieved by depositing multiple (at least two) layers of white or other high contrast ink, providing the necessary contrast for identification information and decoration. HP ElectroInk™ is a suitable ink for this purpose. Preferably, registration marks are printed about each image simultaneous with the images themselves for assisting with later die-cutting. The registration marks define the peripheral cut outline for the appliqué, and four right-angle corner marks are sufficient. Simultaneous with printing, the polyurethane tape with printed image is run directly through a fuser that fuses all layers of ink simultaneously onto the polyurethane tape using heated rollers.

Next, at encapsulation step 130, a second roll of polyurethane tape (3M™ Breathable Polyurethane Tape) is adhered overtop the printed image by its acrylate adhesive (silicone carrier paper is first removed). This sandwiching of the image between two layers of tape encapsulates the image and protects it.

At cutting step 140 the printed double-layer tape is run through a semi-rotary die-cutting machine, which completes to cuts necessary to package the product: 1) kiss-cutting in accordance with the printed registration marks; and 2) cutting tape segments. One skilled in the art should understand that a laser cutter could be used for this purpose. The tape is kiss-cut into discrete skin appliqués 8 (by cutting through the polyurethane tape but not the silicone carrier paper), leaving evenly spaced skin appliqués 8 running continuously along the silicone paper carrier. The waste polyurethane material outside the die shape is removed. Then the silicone carrier is cut into segments to yield the three panels 18 each bearing three skin appliqués 8.

Finally, at packaging step 150, the skin appliqués 8 may be packaged into kit form as described above. If desired, an overlying protective panel 33 may be adhered overtop each segment of appliqués 8 for additional protection.

Referring back to FIG. 3, it can be seen that the finished appliqué 8 itself comprises four layers including a first layer of polyurethane tape 83, with digitally printed image 82 there atop and acrylate adhesive 81 underlying the first layer 83, and a second layer of polyurethane tape 84 (with no image) adhered overtop the first layer 83 to sandwich the image 82 there between.

Specific specifications of the appliqué 8 include:

Tape layers 83, 84 Caliper: 0.05 mm polyurethane tape on liner;

Backing: 0.02 mm translucent polyurethane film

Adhesive 81: Acrylate designed for medical/surgical use

Carriers 18, 33: 60 lb. bleached Kraft paper, silicone on both sides (3.5 mils/0.09 mm).

Figure 5:
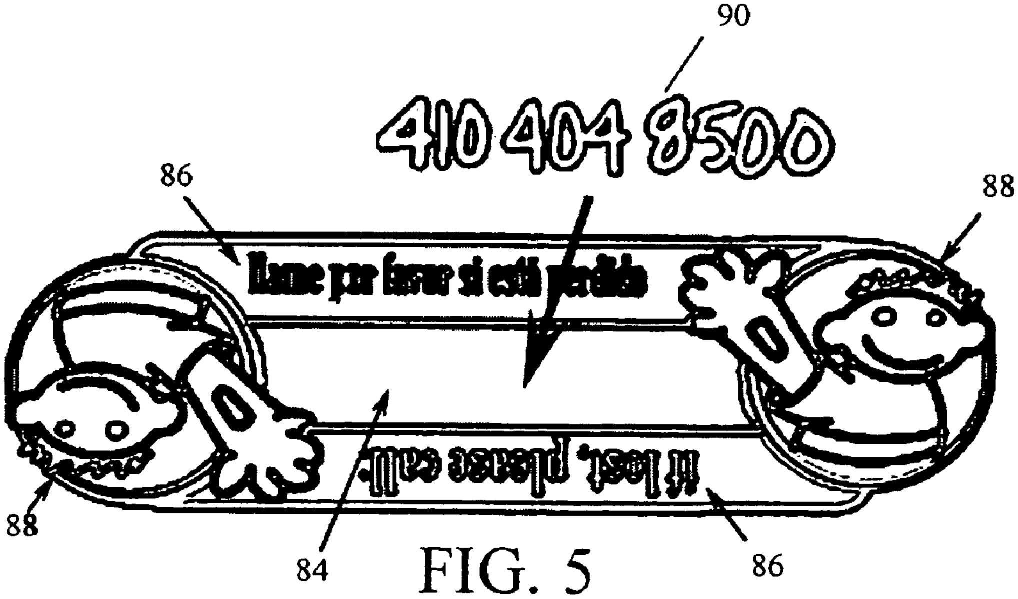
FIG. 5 is a front view of the preferred print design 82 illustrating the primary design elements.

Again, 3M™ Breathable Polyurethane Tape is particularly well-suited for skin application since it is breathable, and the hypoallergenic acrylate adhesive provides for excellent "quick stick" to skin or other surfaces. However, one skilled in the art should understand that other tape and/or adhesive formulations may provide these characteristics, and to that extent would be considered within the scope and spirit of the present invention. The particular print design 82 is also significant, and FIG. 5 is a front view of the preferred print design 82 illustrating the primary design elements. The design 82 includes a central write-in window 84 defined by a light (e.g., yellow or light green) toner filed. The parent or custodians cell phone number 90 is written into this window 84. The window 84 is flanked by identical yet inverted images 88 designed to draw the attention of passersby. In addition, the written plea for help 96 86 appears above and below the window 84 and in both English and Spanish to ensure bilingual usefulness. The plea for help 96 86 is preferably a simple instruction such as "if lost, please call:" and directs attention to the window 94 84 to showcase the cell phone number 90 appearing therein.

Figure 6:
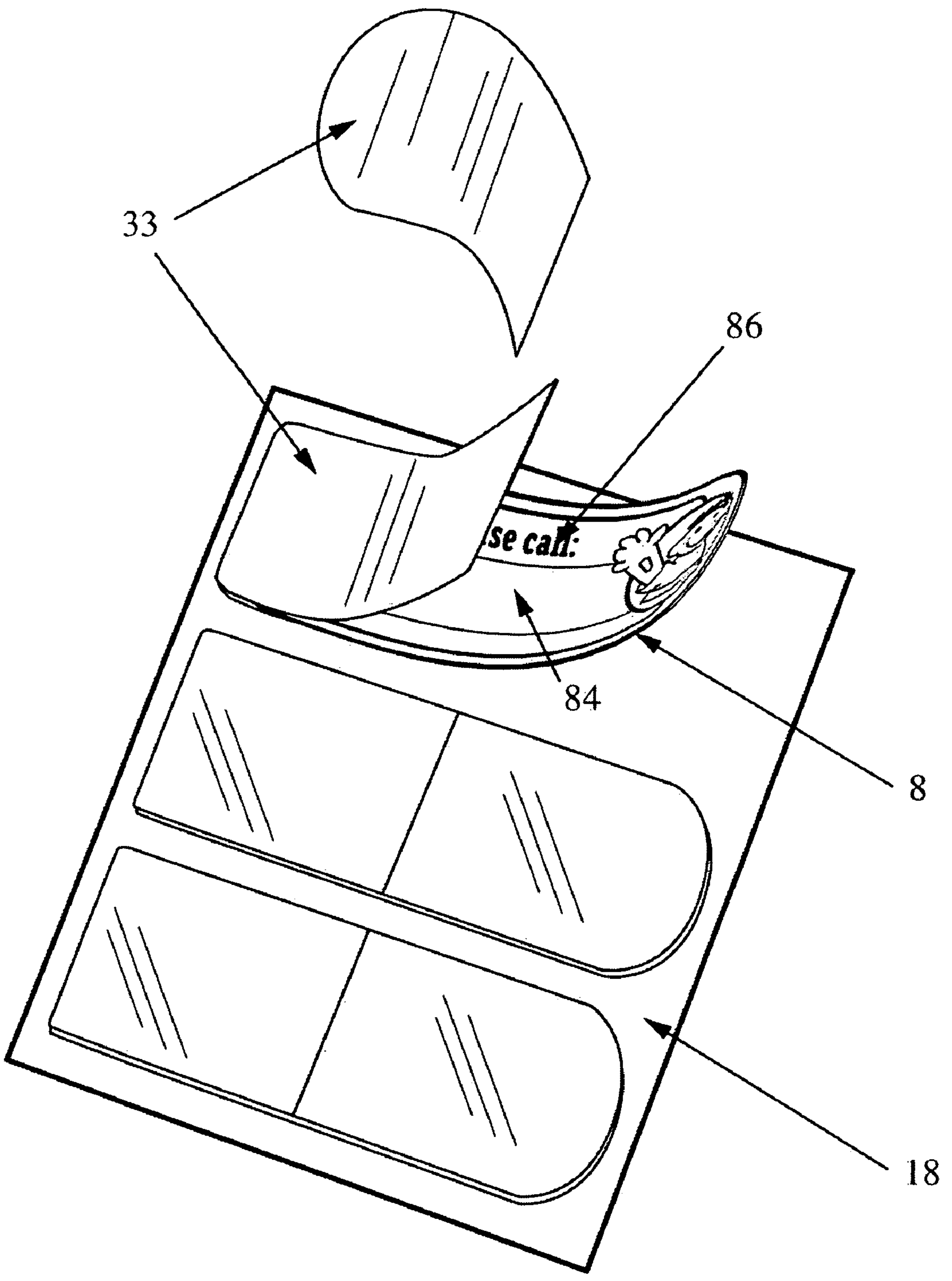
FIG. 6 is a perspective view of an exemplary skin appliqué 8 illustrating the layers.

FIG. 6 is a perspective view of an exemplary skin appliqué 8 illustrating the layers. The appliqué 8 is removably adhered by acrylate adhesive layer 81 to the silicone panel of carrier paper 18, and the overlying protective panel 33 can be peeled away in two sections for application of the applique 8. Both carriers 18 and 33 are removed and discarded during application.

Figure 7:
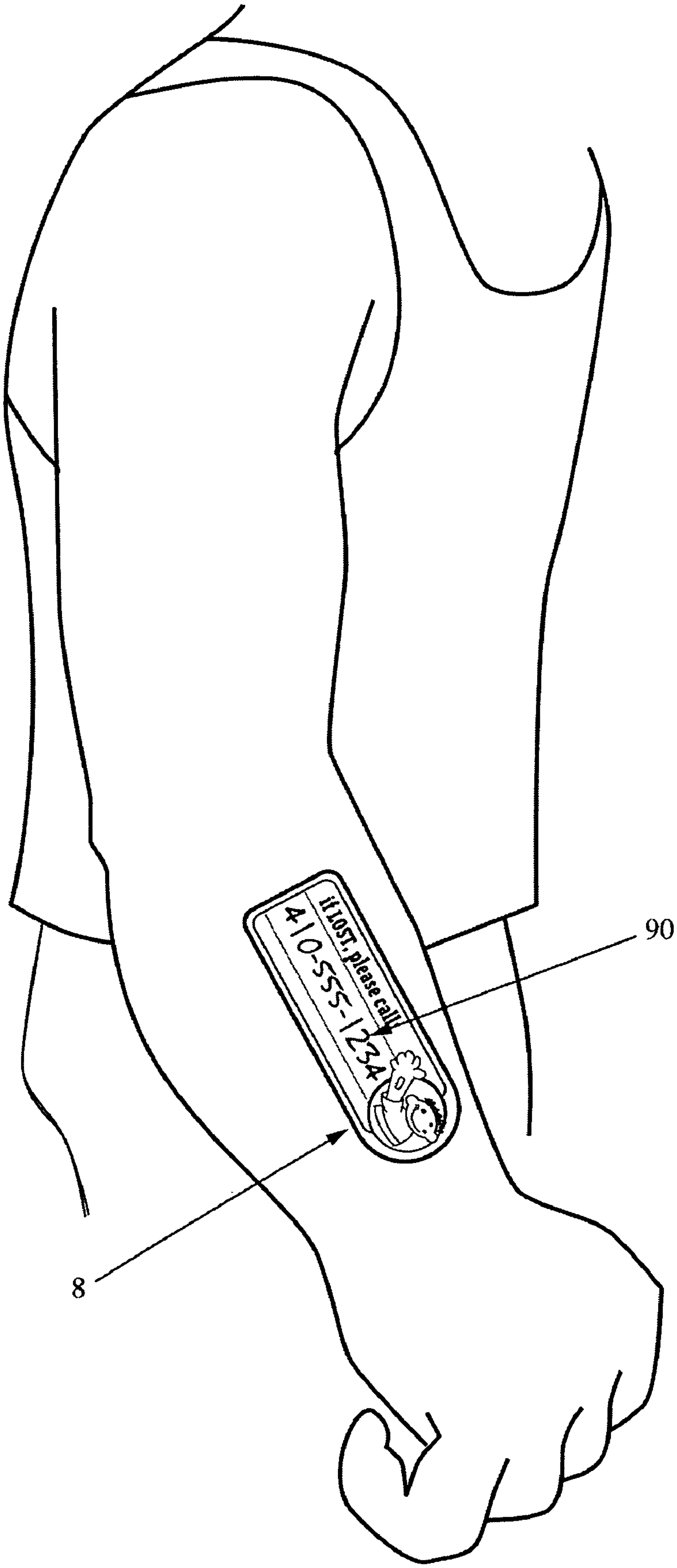
FIG. 7 is a perspective view of a user wearing an exemplary skin appliqué 8.

FIG. 7 is a perspective view of a user wearing an exemplary skin appliqué 8.

At this point, one skilled in the art should realize that the above-described skin appliqués, method if construction, and method of using provides children, disabled persons, and the elderly, a safeguard by which their host, parent, guardian or other responsible person can be contacted if they become lost. The applique's are more readable, and permanent, can last weeks even in an aquatic environment, and will not leach any ink through to the skin.

If desired, the appliques' 8 can be sold individually by custom printing them onsite with the host, parent, or guardian's cell phone number. A sponsoring facility need only set up a desk or kiosk, collect personal information from the host, parent, guardian, and then print one or more appliques' with their cell phone number rather than requiring a write-in with marker 6. This has the additional advantage in that the personal information can be entered into a database which is later available to the sponsor for marketing purposes. This also adds flexibility inasmuch as customers can select from other standard design layouts or templates, and custom images can be printed using digital images jpeg or the like). This form of product may be ordered in advance (online or otherwise).

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims:

I claim:

1. A safety skin appliqué kit for parents and custodians of children, disabled persons, and the elderly, comprising:
- a marking pen comprising bleed resistant ink; and
- a skin appliqué comprising
  - a carrier sheet;
  - first layer of breathable polyurethane tape
  - a layer of water-based primer on one side of said first layer of polyurethane tape for increasing ink adhesion;
  - a forward multi-color ink image printed on said layer of water-based primer, defined by a bounded opaque high-contrast window comprising at least two layers of high contrast white ink, and a proximate text plea to call if lost;
  - a hypoallergenic, acrylate adhesive coating on another side of said first layer of polyurethane tape for application of said appliqué to skin or clothing;
  - a second layer of transparent, breathable polyurethane tape coated with an adhesive coating on one side and adhered thereby on said first layer of polyurethane tape overtop said multi-color ink image; and
  - a protective panel removably adhered overtop said second layer of polyurethane tape;
- whereby parents and custodians can apply one of said appliqués to their child, disabled person, or elderly charge, and write a contact telephone number in the window of the appliqué, so that if said charge becomes lost, passersby will notice the appliqué, read the contact telephone number, and call the custodian.

2. A safety skin appliqué for parents and custodians of children, disabled persons, and the elderly, comprising:
- a carrier sheet;
- a first layer of breathable polyurethane tape;
- a layer of water-based primer on one side of said first layer of polyurethane tape for increasing ink adhesion;
- a multi-color ink image printed on said layer of water-based primer, said ink image comprising a text plea to call if lost proximate a bounded high-contrast window for write-in of a contact telephone number, said window comprising at least two layers of high contrast ink;
- a hypoallergenic, acrylate adhesive coating on another side of said first layer of polyurethane tape for application of said appliqué to skin or clothing;
- a second layer of transparent, breathable polyurethane tape coated with an adhesive coating on one side and adhered thereby overtop said multi-color ink image on said first layer of polyurethane tape;
- a protective panel removably adhered overtop said second layer of polyurethane tape.

3. A method for constructing a safety skin appliqué for parents and custodians of children, disabled persons, and the elderly, comprising the steps of:
- obtaining a first layer of breathable polyurethane tape coated with a hypoallergenic, acrylate adhesive coating on one side and removably adhered to a carrier sheet;
- priming another side of the first layer of polyurethane tape with a water-based primer;
- printing the primed side of said first layer of polyurethane tape with a multi-color ink design including a text plea to call if lost proximate a bounded high-contrast write-in window, said window comprising at least two layers of white or high contrast ink;
- fusing the printed multi-color ink design by running said printed first layer of polyurethane tape through heat rollers;
- encapsulating said printed ink design by adhering a second layer of transparent, breathable polyurethane tape coated with an adhesive coating on one side to said first layer of polyurethane tape overtop said printed ink design;
- kiss-cutting said first and second layers of polyurethane tape about said discrete ink design;
- cutting said carrier sheet into a discrete segment containing at least one ink design.

4. A safety skin appliqué for parents and custodians of children, disabled persons, and the elderly, comprising:
- a carrier sheet;
- a first layer of tape removably adhered to said carrier sheet;
- a layer of primer on one side of said first layer of tape for increasing ink adhesion;
- a multi-color ink image printed on said layer of primer, comprising a text plea to call if lost proximate a bounded high-contrast window;
- an adhesive coating on another side of said first layer of tape for application of said appliqué to skin or clothing; and
- a second layer of transparent tape coated with an adhesive coating on one side and adhered thereby overtop said multi-color ink image on said first layer of tape.

5. The safety skin appliqué according to claim 4, further comprising a protective panel removably adhered overtop said second layer of tape.

6. The safety skin appliqué according to claim 4, wherein said first and second layers of tape comprise polyurethane.

7. The safety skin appliqué according to claim 6, wherein said first and second layers of polyurethane tape are breathable.

8. The safety skin appliqué according to claim 4, wherein said contrast window comprises at least two layers of white or other contrasting ink.

9. The safety skin appliqué according to claim 4, wherein said adhesive coating comprises a hypoallergenic, acrylate adhesive.

10. A method for constructing a safety skin appliqué for parents and custodians of children, disabled persons, and the elderly, comprising the steps of:

providing a first layer of tape coated with an adhesive coating on one side;

priming another side of the first layer of tape with a primer;

printing the primed side of the first layer of tape with a multi-color ink design including a return message proximate a bounded high-contrast write-in window;

fusing the printed multi-color ink design by running said printed first layer of tape through heat rollers;

encapsulating said printed ink design by adhering a second layer of transparent breathable polyurethane tape coated with an adhesive coating on one side to said first layer of tape overtop said printed ink design;

kiss-cutting said first and second layers of tape about said ink design;

cutting said carrier sheet into a discrete segment containing at least one ink design.

11. The method for constructing a safety skin appliqué according to claim 10, further comprising adhering a protective panel overtop said second layer of tape.

12. The method for constructing a safety skin appliqué according to claim 10, wherein said first and second layers of tape comprise polyurethane.

13. The method for constructing a safety skin appliqué according to claim 12, wherein said first and second layers of polyurethane tape are breathable.

14. The method for constructing a safety skin appliqué according to claim 10, wherein said contrast window comprises at least two layers of white or other contrasting ink.

15. The method for constructing a safety skin appliqué according to claim 4, wherein said adhesive coating comprises a hypoallergenic, acrylate adhesive.

* * * * *